(12) United States Patent
Riepe (10) Patent No.: US 12,019,280 B2
(45) Date of Patent: Jun. 25, 2024

(54) FERRULE THAT CAN BE ASSEMBLED IN THE FIELD, AND ASSOCIATED FERRULE HOUSING

(71) Applicant: HARTING Electric Stiftung & Co. KG, Espelkamp (DE)

(72) Inventor: Dieter Riepe, Luebbecke (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 66 days.

(21) Appl. No.: 17/915,064

(22) PCT Filed: Apr. 14, 2021

(86) PCT No.: PCT/DE2021/100340
§ 371 (c)(1),
(2) Date: Sep. 27, 2022

(87) PCT Pub. No.: WO2021/213585
PCT Pub. Date: Oct. 28, 2021

(65) Prior Publication Data
US 2023/0143247 A1    May 11, 2023

(30) Foreign Application Priority Data
Apr. 23, 2020   (DE) ................. 10 2020 111 054.5

(51) Int. Cl.
*G02B 6/38* (2006.01)
(52) U.S. Cl.
CPC ......... *G02B 6/3831* (2013.01); *G02B 6/3858* (2013.01); *G02B 6/3869* (2013.01)

(58) Field of Classification Search
None
See application file for complete search history.

(56) References Cited

U.S. PATENT DOCUMENTS

| | | | | |
|---|---|---|---|---|
| 5,212,752 A | * | 5/1993 | Stephenson | G02B 6/3843 385/139 |
| 5,394,497 A | * | 2/1995 | Erdman | G02B 6/3855 385/60 |
| 6,206,581 B1 | * | 3/2001 | Driscoll | G02B 6/3869 385/139 |

(Continued)

FOREIGN PATENT DOCUMENTS

| | | |
|---|---|---|
| DE | 202014103835 U1 | 11/2015 |
| EP | 1091226 B1 | 12/2008 |

(Continued)

*Primary Examiner* — Jerry Rahll
(74) *Attorney, Agent, or Firm* — Smartpat PLC (57) ABSTRACT

A ferrule can be assembled in the field. A ferrule collar has a non-circular, in particular polygonal outer contour. A corresponding coding region of a ferrule housing is arranged in a portion of a contact chamber on a cable-connection side and has a non-circular, in particular polygonal cross section, in which the ferrule collar is held with a form fit over the entire spring displacement path. The ferrule spring acts on the ferrule collar over the entire displacement path. As a result, the ferrule is secured against rotation about its axis by a high holding force, which makes it easier for a fibre-optic cable to be screwed on. The structural form is particularly well-suited for use in a plug-in connector module.

16 Claims, 4 Drawing Sheets

(56) References Cited

U.S. PATENT DOCUMENTS

| | | | | |
|---|---|---|---|---|
| 7,758,256 | B2* | 7/2010 | Hopkins | G02B 6/3821 |
| | | | | 385/60 |
| 8,070,367 | B2* | 12/2011 | Winberg | G02B 6/38875 |
| | | | | 385/75 |
| 8,931,963 | B2* | 1/2015 | Scopic | G02B 6/38875 |
| | | | | 385/139 |
| 2002/0090179 | A1 | 7/2002 | Iwano et al. | |
| 2003/0215191 | A1* | 11/2003 | Taira | G02B 6/3821 |
| | | | | 385/78 |
| 2007/0292084 | A1* | 12/2007 | Gurreri | G02B 6/3869 |
| | | | | 385/78 |
| 2012/0219254 | A1* | 8/2012 | Bradley | G02B 6/3885 |
| | | | | 29/407.09 |
| 2012/0257859 | A1* | 10/2012 | Nhep | G02B 6/3823 |
| | | | | 385/81 |
| 2012/0301085 | A1* | 11/2012 | Grinderslev | G02B 6/3888 |
| | | | | 385/136 |
| 2013/0183007 | A1* | 7/2013 | Scopic | G02B 6/36 |
| | | | | 385/77 |
| 2014/0286611 | A1* | 9/2014 | Pratt | G02B 6/3888 |
| | | | | 385/78 |
| 2017/0336576 | A1* | 11/2017 | Bund | G02B 6/3861 |
| 2020/0408998 | A1* | 12/2020 | Iizumi | G02B 6/3857 |
| 2023/0143247 | A1* | 5/2023 | Riepe | G02B 6/3831 |
| | | | | 385/53 |

FOREIGN PATENT DOCUMENTS

| | | |
|---|---|---|
| EP | 1199584 B1 | 9/2014 |
| WO | 2012041840 A1 | 4/2012 |

* cited by examiner

FERRULE THAT CAN BE ASSEMBLED IN THE FIELD, AND ASSOCIATED FERRULE HOUSING

TECHNICAL FIELD

The disclosure relates to a ferrule, a ferrule housing, a system for an optical plug-in connector having a ferrule and a ferrule housing, and to a ferrule spring, a latching sleeve, a press-fittable screw connection, and a screwing element. The disclosure further relates to a method for assembling such a system and to an optical plug-in connector module for a plug-in connector modular system.

BACKGROUND

Document WO 2012/041840 A1 discloses an OWG plug-in connector. This plug-in connector has a main body with a through-opening, a tubular conductor holder and an anti-kink element. The conductor holder is arranged at least partially within the main body and is movably mounted therein. A spring element is provided for positioning the conductor relative to the main body and is clamped between the conductor holder and the anti-kink element.

The main body has a limit stop projecting radially inwards. In a manner complementary to the limit stop, the conductor holder has a radially outwardly projecting circular collar as a feed stop, with which the conductor holder is pressed in the basic state in the axial direction by the spring force in the insertion direction against the limit stop of the main body. Furthermore, the main body has a polarization portion with a polygonal cross-section, for example with a quadrangular or even square cross-section, in its through-opening on the plug-in side of the circular collar. This polarization portion thus has inner guide surfaces. On the conductor holder, a polarization molding with a plurality of outer guide surfaces is provided on the plug-in side of the collar. When the conductor holder is inserted into the main body, the outer guide surfaces of the conductor holder come to rest against the inner guide surfaces of the main body, so that the conductor holder is fixed in its orientation relative to the main body and is secured against rotation about the longitudinal axis relative to the main body.

Preferably, the inner guide surfaces of the main body and the outer guide surfaces of the conductor holder have an axial length such that the conductor holder remains guided by these surfaces over the entire possible spring travel within the main body. These guide surfaces therefore jointly form a guide device on the main body and on the conductor holder.

A disadvantage of this design is that the ferrule region which has the guide surfaces must be at least as long as the entire spring travel so that the ferrule does not tilt in the sprung-back state. This either causes considerable space problems for the usual housing designs, for example so-called "SC" (Subscriber Connector) housings, the external dimensions of which are necessarily specified and possibly also standardized for plug-in compatibility, since the housing must therefore provide correspondingly long guide surfaces on the plug-in side of the stop face—or the spring travel must be shortened. The latter means that the conductor holder (ferrule) in the main body (ferrule housing) has a correspondingly small tolerance range, which is very disadvantageous for many OWG applications.

If an attempt is nevertheless made to extend the spring travel—and thus the inner guide surfaces—on the basis of these general conditions, this also has a negative effect on the housing stability for given housing outer dimensions, because the commonly used ferrule housings, in particular the SC housings mentioned, generally have an external taper on the plug-in side of the feed stop, for example to provide space for latching means for latching with a mating connector. Lengthening the polarization portion inevitably reduces the material in this region. This also reduces its stability and, in particular, the shear forces that it can absorb.

In other words, there is a danger with this design that the thickness of the ferrule housing walls in the region of the tapered housing portion is reduced by the need for the longest possible inner guide surfaces. It is possible that this design is suitable for polarizing the ferrule for common spring deflections. However, it is not well suited for absorbing the screwing forces when screwing an OWG to the ferrule, and certainly not when particularly long spring travel is required. Thus, this design is not well suited for in-field assembly in the sense of a cable gland, especially alongside high requirements for tolerance compensation/said spring deflection.

Such a cable gland of the OWG at the ferrule is to be regarded here as in-field assembly, because—in contrast to factory crimping—it can be carried out "in the field" using common tools, i.e. no trained specialist personnel with special tools is required for the assembly.

Lastly, the following particularly disadvantageous variant should also be noted: If the spring travel is extended without matching the length of the guide surfaces, i.e. if the guide surfaces are shorter than the spring travel, then it may be possible to achieve sufficient housing stability even against screwing and shearing forces with adequate spring deflectability. However, at the same time, the particularly large disadvantage arises that a heavily deflected ferrule with its guide surfaces cants behind the feed stop and the ferrule no longer automatically returns to its starting position.

Then, appropriately trained specialist personnel must rotate the ferrule back into its correct rotational position. There is therefore a corresponding need for explanation to the customer, but this is highly undesirable. In particular, in the case of more complex designs, for example in a plug-in connector modular system, this may even necessitate disassembly of the plug-in connector, which is of course unreasonable for the customer.

The German Patent and Trade Mark Office has searched the following prior art in the priority application for the present application: U.S. Pat. No. 5,394,497 A, EP 1 199 584 A1, DE 20 2014 103 835 U1, and EP 1 091 226 B1.

SUMMARY

Ferrules, ferrule housings and systems are required for optical waveguide ("OWG") plug-in connectors and plug-in connector modules in order on the one hand to connect an OWG on the cable connection side and on the other hand to establish an OWG plug-in connection to an OWG mating connector or an OWH mating connector module on the plug-in side.

For this purpose, the ferrule is usually arranged in a continuous contact chamber of the ferrule housing. In the unplugged state, part of the plug-in region of the ferrule protrudes from the ferrule housing on the plug-in side. To compensate for tolerances on the plug-in side, a so-called "spring-deflectability" is necessary for so-called "spring-loaded ferrules". This means that in the starting state the plug-in region of the ferrule is spring-loaded and can be displaced into the ferrule housing by a predetermined sliding path, that is to say by the so-called "spring travel". As a result, the plug-in region of the ferrule can dip deeper into the ferrule housing by said spring travel under an external force effect, for example when plugged with a mating connector, in particular by applying a counterforce of 7.8 N to 11.8 N, and is thus in the so-called "spring-deflected" state, thereby ensuring the desired tolerance compensation on the plug-in side.

In this way, two OWGs of two interconnected OWG connectors can abut each other directly, regardless of minor design-related geometric deviations of different plug-in systems and/or inaccuracies in the manufacture of the plug-in connectors, in order to ensure the best possible signal transmission. In the process, their spring travel and thus their tolerances add up. Particularly large tolerances are required if the ferrule is part of a plug-in connector module and thus of a plug-in connector modular system, because in this case a particularly large number of different plug-in connector modules with a wide range of properties and requirements need to be able to be used together as flexibly as possible.

Plug-in connector modules are basically required as part of a plug-in connector modular system in order to be able to flexibly adapt a plug-in connector, in particular a heavy industrial plug-in connector, to specific requirements regarding signal and power transmission, for example between two electrical devices. Usually, plug-in connector modules are inserted into corresponding holding frames, which are sometimes also referred to as hinged frames, module frames or modular frames, for this purpose. The holding frames are thus used to hold a plurality of plug-in connector modules that are similar to each other and/or also different from each other and to securely fasten them to a surface and/or a device wall and/or in a plug-in connector housing or the like.

The plug-in connector modules usually each have a substantially cuboidal insulating body. These insulating bodies can, for example, serve as contact carriers and can accommodate and fix contacts of various types. The function of a plug-in connector formed in this way is therefore very flexible. For example, pneumatic modules, modules for transmitting electrical energy and/or electrical analog and/or digital signals can be accommodated in the particular insulating body or housing and thus can be used in the plug-in connector modular system. In particular, so-called optical modules, that is to say also said OWG modules for optical signal transmission, can also be used. Since the plug-in connector modular systems have mechanical tolerances that correspond to the robust use of the field of heavy-duty plug-in connectors, particularly high requirements are placed on the mechanical tolerances of the variable length compensation for plugging with a mating connector for OWG modules. Lastly, in the case of optical transmission, the optical waveguides (OWG) of the connector and mating connector should touch each other at their ends as far as possible, while in electrical connectors a length compensation is usually provided naturally by the variable plug-in depth between the contact pin and socket.

So-called hinged frames, i.e. holding frames, formed from two frame halves which are hinged together are frequently used for plug-in connector modular systems. The plug-in connector modules are provided with approximately rectangular holding means projecting on the narrow sides. Recesses formed as openings closed on all sides are provided in the side parts of the frame halves, and the holding means dip into said recesses when the plug-in connector modules are inserted into the holding frame. To insert the plug-in connector modules, the holding frame is unfolded, i.e. opened, wherein the frame halves are unfolded about the joints only to such an extent that the plug-in connector modules can be inserted. The frame halves are then folded together, i.e. the holding frame is closed, wherein the holding means enter the recesses and a secure, form-fitting holding of the plug-in connector modules in the holding frame is realized.

One-piece plastics frames, however, can also be used. Furthermore, plug-in connector modular frames can be used, which each have a rigid base frame, wherein the base frames are produced, for example, by zinc die-casting, and which are provided on their longitudinal sides with a plurality of flexible cheek parts, for example stamped and bent parts. Such plug-in connector modular frames have the advantage that the plug-in connector modules can be inserted into the plug-in connector modular frame with little effort.

The problem addressed by the disclosure is that of describing a ferrule that can be assembled in the field and an associated ferrule housing in which the ferrule is guided relative to the ferrule housing over the greatest possible spring travel without canting. In particular, the ferrule housing can be a so-called "SC" (Subscriber Connector) housing according to standard DIN EN 61754-4 or IEC 61754-4.

At the same time, a convenient manual and stable screwing of an optical waveguide (OWG) to the ferrule should be possible without exposing the ferrule housing to the risk of at least partial mechanical overstressing.

This problem is solved by the subject matter of the independent claims.

A ferrule has a hollow-cylindrical ferrule tube for accommodating an optical waveguide and a ferrule axis defined by this hollow-cylinder shape. The ferrule has a plug-in region at a plug-in-side end of the ferrule tube and a cable connection region at an opposite cable-connection-side end of the ferrule tube. Between the plug-in region and the cable connection region, the ferrule has an in particular circumferential and substantially planar ferrule collar having a plug-in-side limit stop face and a cable connection-side spring engagement face, which are preferably oriented at right angles to the ferrule axis. The ferrule collar has a non-circular outer contour, in particular a polygonal outer contour.

In a preferred design, the plug-in-side length of the ferrule collar, i.e. its dimension in the plug-in direction, is extremely limited. In particular, the plug-in-side length of the ferrule collar is less than 20% of the length of the cable connection region. Preferably, the plug-in-side length of the ferrule collar is less than 15% of the length of the cable connection region. Particularly preferably, the plug-in-side length of the ferrule collar is less than 10% of the length of the cable connection region and, in particular, can even be less than 7.5% of the length of the cable connection region.

A ferrule housing has a substantially cuboidal outer contour with a plug-in-side housing portion and a cable-connection-side housing portion, and a contact chamber running longitudinally through the ferrule housing for receiving a ferrule of the aforementioned type. The term "substantially cuboidal outer contour" may mean here at least the following:

The outer contour of the ferrule housing can deviate from an ideal cuboid by having rounded edges, and alternatively or additionally by having one or more chamfers on its cuboid edges at least in some portions, in particular at its plug-in-side end. Furthermore, the ferrule housing can have latching tabs, in particular on two opposing side walls, for fixing a latching sleeve plugged into its contact chamber on the cable connection side. In addition, the ferrule housing can taper slightly towards its plug-in-side end at a plug-in-side housing portion by having an indentation on each side. At least part of a latching mechanism, in particular latching means for latching with a mating connector, can be arranged in each of these indentations.

For example, a latching projection, for example a latching lug or preferably a latching rib extending transversely to the insertion direction, in particular over the entire side wall, can be integrally molded in each indentation so as to point outwards, in particular without protruding from the indentation, i.e., the height of the latching projection does not exceed the depth of the indentation. Preferably, its height corresponds to the depth of the indentation.

In addition, the ferrule housing can have an external coding, for example a plug-in-side bevel/chamfer on one side, to ensure its own correct polarization, if necessary, when it is potentially received in an insulator, especially in an insulator of a plug-in connector module.

Furthermore, the ferrule housing has a contact chamber for receiving the ferrule, said contact chamber running longitudinally through the ferrule housing in the plug-in direction and having a plug-in-side chamber portion on the one hand and a cable-connection-side chamber portion on the other hand, wherein the cable-connection-side chamber portion has a coding region with a cross-section that deviates from a circular shape, in particular a polygonal cross-section. In this coding region, the ferrule collar can be accommodated and held form-fittingly, so that the ferrule accommodated by the ferrule housing can be displaced by the predetermined spring travel along its ferrule axis, but cannot be rotated about its ferrule axis.

The ferrule housing, between the plug-in-side chamber portion and the cable-connection-side chamber portion, has a feed stop by which the contact chamber tapers at least on the cable connection side. In other words, the cable-connection-side chamber portion narrows at the feed stop. In particular, the feed stop can have a stop face on the cable connection side.

The coding region is part of the cable-connection-side chamber portion and preferably is directly adjacent to the feed stop. The length of the coding region corresponds to at least a predetermined spring travel of the ferrule in the ferrule housing, in order to ensure the desired cant-free spring deflectability. Thus, the plug-in region of the ferrule can be moved into the ferrule by the corresponding sliding distance without the ferrule rotating and thereby canting. Lastly, the ferrule is held form-fittingly in the coding region by its ferrule collar via this sliding movement and is thus secured against rotation about its ferrule axis.

An advantage is that the coding region is arranged in a cable-connection-side housing portion in which material of the housing—unlike in the plug-in-side housing portion—has no indentation. This stability enables a particularly convenient manual screwing of an optical waveguide to the ferrule with a high screwing force, wherein the ferrule is held on the ferrule housing with a high holding force during the screwing without the ferrule housing being exposed to the risk of overstressing. This makes it possible, for example, to screw an optical waveguide (OWG) to the ferrule on the cable connection side, for example with one hand, while holding the ferrule on the ferrule housing with the other hand to prevent it from "spinning" about its ferrule axis. This ensures the aforementioned capability for in-field assembly.

It is of particular advantage that the contact chamber has a non-circular cross-section in its encoding region, in particular a polygonal cross-section. In other words, the cross-section of the ferrule housing in the region of its coding region has a non-circular inner contour, in particular a polygonal inner contour. The length of the coding region corresponds at least to the length of the predetermined sliding path of the ferrule in the ferrule housing, i.e. the length of the desired spring travel. In this way, the predetermined sliding path can be particularly large because the coding region is part of the cable-connection-side chamber portion of the ferrule housing. In particular, the ferrule housing can have, over the entire coding region, a polygonal inner contour in which the particularly polygonal ferrule collar engages form-fittingly. Canting of the ferrule is thus prevented over the entire sliding path/spring travel.

In particular, the plug-in-side length of the ferrule collar is smaller than the sliding path. In this case, too, the ferrule is prevented from tilting over the entire sliding path.

A system for an OWG plug-in connector has a ferrule and a ferrule housing of the aforementioned type, as well as a ferrule spring, a latching sleeve, a separate screw connection that can be attached to the cable connection region of the ferrule, and a screwing element. The latching sleeve has a holding collar with which it is latched in the ferrule housing at the end of the cable-connection-side chamber portion. It also has a hollow-cylindrical ferrule feedthrough opening in which the ferrule is accommodated with its cable connection region form-fittingly and displaceably along the ferrule axis. Furthermore, the ferrule is guided through the contact chamber of the ferrule housing. Its ferrule collar is form-fittingly received in the coding region of the ferrule housing. This prevents the ferrule from rotating about its ferrule axis. In a starting state, the ferrule protrudes from the ferrule housing with its plug-in region by at least the specified spring travel on the plug-in side and simultaneously protrudes from the latching sleeve with its cable connection region on the cable connection side. Preferably, its movement in the plug-in direction is limited by its ferrule collar abutting the feed stop with its limit stop face in the starting state.

The sliding path is determined here by the geometry between the contact chamber of the ferrule housing and the ferrule, in particular by the coding region and the ferrule collar. Due to the force effect of the ferrule spring, which preferably acts over the entire sliding path, the sliding path is the spring travel. The spring-loaded sliding path is therefore to be regarded as the spring travel. If a high spring travel is required, this presupposes a sliding path that is at least as large, which results from the geometry of the ferrule and the ferrule housing.

Preferably, the ferrule spring is a helical spring that surrounds the cable connection region of the ferrule and is at least partially located in the coding region of the ferrule housing.

A method for assembling such a system comprises the following steps:

A. the ferrule is inserted into the ferrule housing on the cable connection side, wherein its ferrule collar slides through the coding region of the cable-connection-side chamber portion, wherein the ferrule collar form-fittingly cooperates with the coding region in order to fix the polarization of the ferrule in the ferrule housing and thereby allows a displacement of the ferrule in the direction of the ferrule axis by the predetermined spring travel, but at the same time prevents a rotation of the ferrule about the ferrule axis, wherein said insertion process takes place until B. the ferrule is in the starting state relative to the ferrule housing, in which the ferrule collar, with its limit stop face, abuts the feed stop of the ferrule housing and the plug-in region of the ferrule projects out of the ferrule housing on the plug-in side at least by the predetermined spring travel;

C. the ferrule spring is plugged on the cable connection side onto the cable connection region of the ferrule in the contact chamber of the ferrule housing, wherein the ferrule spring is guided unhindered through the coding region until it engages the spring engagement face of the ferrule collar;

D. the latching sleeve is plugged onto the cable connection region of the ferrule in the contact chamber of the ferrule housing and latched at the cable-connection-side end of the ferrule housing in the contact chamber, wherein the holding collar latches the latching sleeve on the ferrule housing and simultaneously compresses the ferrule spring engaging the holding collar, so that the ferrule spring is under constant pretension and, already in the initial state, presses against the spring engagement face of the ferrule collar while being supported on the holding collar and presses the ferrule collar against the feed abutment of the ferrule housing;

E. the separate screw connection is plugged with its press-on collar onto the cable-connection-side end of the ferrule tube, i.e. onto the cable connection region of the ferrule, in particular until it abuts the latching sleeve, in particular with a stop collar of the latching sleeve. The press-on collar is then F. pressed onto the cable connection region of the ferrule tube by means of a tool and thus attached to it;

G. an OWG is inserted through the screwing element into the cable-connection-side end of the ferrule tube and pushed into the ferrule tube until its end is flush with the plug-in-side end of the ferrule tube;

H. the screwing element is screwed onto the screw connection and the OWG is thereby fixed in the ferrule.

Advantageous embodiments are described in the dependent claims and the following description.

The screw connection can be a one-piece design. The screw connection can be a turned part. The screw connection can be attached to the cable connection region of the ferrule. In particular, the separate screw connection can be a press-fittable screw connection. For this purpose, the screw connection can, for example, have a press-on collar with a cylindrical ferrule insertion opening. With this ferrule insertion opening, it can be plugged onto the part of the ferrule tube protruding from the latching sleeve on the cable connection side, that is to say the cable connection region of the ferrule tube, and pressed onto it for fastening.

Adjacently to the press-on collar, the screw connection can have a hollow-cylindrical threaded portion with an external thread and an OWG feedthrough opening The OWG feedthrough opening can have a smaller diameter than the ferrule insertion opening and can be directly adjacent thereto. Thus, an OWG can be inserted into the ferrule tube through the OWG feedthrough opening.

In a preferred embodiment, the press-fittable screw connection can have a conically tapered, thread-free end portion adjacent to its threaded portion. The optical waveguide feedthrough opening runs through this end portion. The end portion can have a plurality of slots which preferably extend into the threaded portion.

The screwing element can have a through-opening, and the through-opening can have a screw portion with an internal thread and a funnel-shaped, thread-free end region connected thereto. This allows the screwing element to fix an OWG guided through the ferrule tube—and thus arranged in the ferrule tube—to the ferrule by screwing to the screw connection.

The ferrule spring can be a helical spring which radially engages around the cable connection region of the ferrule. On the one hand, the ferrule spring can be supported on a holding collar of the latching sleeve and, on the other hand, it can engage the spring engagement face of the ferrule collar in order to press it in the direction of the feed stop of the ferrule housing. In the process, the ferrule spring can move unhindered through the coding region of the ferrule housing, i.e. can expand unhindered in the axial direction through the contact chamber and of course also compress.

In a preferred embodiment, the aforementioned system is part of a plug-in connector module of the type mentioned at the outset. In particular, the ferrule housing can have said coding for its correct polarization in the plug-in connector module.

The plug-in region of the ferrule protruding from the ferrule housing on the plug-in side can be pushed into the ferrule housing by said spring-loaded spring travel. The ferrule can thus be spring-deflected.

A particularly great advantage is that the ferrule is thus set up to be guided over a comparatively large sliding path and thus also over a correspondingly large spring travel in the ferrule housing without canting at the same time.

The spring travel (sliding path) can be more than 1.25 mm here, preferably more than 1.5 mm, particularly preferably more than 1.75 mm and in particular more than 2 mm, in particular also for the mentioned SC housings. With this design, in particular for said SC housings, it is even possible to realize spring travel (sliding paths) that are greater than 2.25 mm and even 2.5 mm, without the described canting taking place.

This particularly large tolerance compensation is especially important for the use of the system in a plug-in connector module for a plug-in connector modular system, because in the region of heavy-duty plug-in connectors mechanical tolerances and in particular a variable length compensation are required, which are larger than is generally usual and known in the OWG plug-in connector field.

Another significant advantage is that the ferrule can be assembled in the field because the optical waveguide can be connected to the ferrule manually in a convenient manner, namely, it can be screwed to it non-destructively, in particular also with high screw force. This is also of particular advantage for use in a plug-in connector module, since the user of a plug-in connector modular system himself wants to connect his modules individually, quickly and flexibly on site.

Another advantage is that the ferrule in the ferrule housing is held form-fittingly and stably in its orientation with regard to rotation about the ferrule axis, which facilitates manual screwing.

A further advantage, viewed in reverse, is that a particularly large, cant-free spring travel (sliding path) is made possible for a ferrule that can be assembled in the field in a ferrule housing of which the external housing dimensions are predetermined, that is to say in relation to the length of the ferrule housing. This enables particularly large tolerance compensation without the risk of canting.

Such canting, which requires manual intervention and possibly disassembly, has an extremely detrimental effect in more complex plug-in connector systems, in particular in plug-in connector modular systems. Conversely, avoiding such canting is extremely advantageous.

Furthermore, it is of great advantage that a convenient manual and also very stable screwing (suitable for assembly in the field) of an optical waveguide (OWG) to the ferrule with high screwing forces is made possible without exposing the ferrule housing to the risk of partial mechanical overstressing.

In a preferred embodiment, the ferrule and the screwing element are made of metal. In particular, the ferrule can be a turned part, i.e. a metal part, preferably made of copper or brass or a copper or brass alloy, which is produced by turning and, if necessary, also milling and/or sawing. The screwing forces must be correspondingly high in order to achieve sufficient deformation of this material for fixing the cable.

In a preferred embodiment, the non-circular outer contour of the ferrule collar can be a polygonal outer contour. For example, the polygonal outer contour of the ferrule collar can be an octagon or a hexagon, particularly an irregular octagon, formed, for example, from a regular hexagon by flattening two opposite corners.

In another advantageous embodiment, the ferrule tube may have a smaller outer diameter and/or inner diameter at its mating region than at its cable connection region.

The screwing element can be a knurled nut, for example.

The screwing element can be screwed with its internal thread to the external thread of the screw connection for fixing the optical waveguide by its funnel-shaped end region cooperating with the conical end portion of the screw connection in order to deform the screw connection in the region of its slots at least to such an extent that the OWG passed through it, which is naturally particularly hard, is fixed therein. The presence of the slots in the end portion and in particular also in the threaded portion is therefore extremely advantageous in order to enable this—relatively small but sufficient—deformation.

In a preferred embodiment, the ferrule spring can be a helical spring. Then, the ferrule tube can be passed with its cable connection region through the ferrule spring.

The latching sleeve can have a holding collar. The ferrule spring can on the one hand be supported on this holding collar of the latching sleeve and on the other hand can engage the spring engagement face of the ferrule collar, wherein its spring force acts on the ferrule collar in the direction of the feed stop.

In the starting state, i.e. in the unplugged, non-spring-deflected state of the system, the plug-in region of the ferrule of the system mounted as planned protrudes from the ferrule housing by at least the specified spring travel. In this starting state, the press-on collar of the screw connection can abut the latching sleeve, and in particular a cable-connection-side stop collar of the latching sleeve, due to the spring force of the ferrule spring. This is advantageous because the preferably metallic press-on collar can absorb a particularly large amount of force without deformation or destruction. Alternatively or additionally, in the starting state the ferrule collar abuts the feed stop of the ferrule housing. This is advantageous because it makes particularly good use of the space in the ferrule housing, facilitates assembly, and optimizes the guidance of the ferrule. Ideally, therefore, the ferrule collar can abut the feed stop and the press-on collar can abut the stop collar at the same time. This is particularly advantageous because the stop collar relieves the ferrule housing, which is preferably made of plastic, of the mechanical pressure that would otherwise act constantly in the starting state.

In a further embodiment, the press-fittable screw connection—with the advantage of a modular principle—can also be replaced by a press-fittable crimp connection. Then, the need for the screw element is also eliminated. This may at least call into question the suitability of this design for assembly in the field. However, the ability for spring deflection is at least as important, because the OWG can be positioned much more precisely in the ferrule when the cable connection is crimped, and a correspondingly high requirement is then also placed on the spring-deflectability of the system.

To summarize, but not limit, a person skilled in the art can thus infer from the aforementioned technical teaching, among other things, the following:

In order to increase the extent to which a ferrule that can be assembled in the field can experience spring travel in a ferrule housing, and at the same time to prevent canting of the ferrule over the entire spring travel, the following particularly advantageous embodiment is disclosed:

the ferrule collar has a non-circular, in particular polygonal outer contour;

the corresponding coding region of the ferrule housing is arranged in a cable-connection-side contact chamber portion and has a non-circular, in particular polygonal cross-section, in which the ferrule collar is held form-fittingly over the entire spring travel, the ferrule spring engages the ferrule collar over the entire sliding path, and thus over the entire spring travel.

As a result, the ferrule is additionally secured against rotation about its ferrule axis by a high holding force, which makes it easier for an optical waveguide (OWG) to be screwed into the ferrule. The design is also particularly well suited for use in a plug-in connector module of a plug-in connector modular system, in particular due to the large tolerances.

To summarize in other words:

The plug-in-side length of the ferrule collar is significantly smaller than the sliding path. Both the ferrule collar and the ferrule spring, which is preferably a helical spring, are arranged in the coding region of the ferrule housing. The ferrule is thus prevented from canting over the entire sliding path because the—comparatively short—ferrule collar cannot move out of the coding region. At the same time, a relatively large sliding path is made possible.

The freedom from canting and the large sliding path are simultaneously made possible by the fact that the entire coding region has a polygonal inner contour which corresponds to the polygonal outer contour of the ferrule collar, while at the same time the ferrule spring, which is preferably embodied as a helical spring, is also arranged—at least partially—in the coding region, surrounding the cable connection region of the ferrule spring.

Due to the comparatively high material thickness which the ferrule housing has—or at least can have—at the coding region due to its design, the ferrule is secured against rotation about the ferrule axis with a high rotation-inhibiting holding force. This rotation-inhibiting holding force is large enough to allow an optical waveguide to be screwed to the screw connection of the ferrule by means of the screwing element while the ferrule is already inserted into the ferrule housing. This is of very great advantage for the possibility of in-field assembly.

This suitability for in-field assembly of the screw connection as well as the particularly large sliding path that this design permits are of particular advantage for use in a plug-in connector module, which naturally has to meet particularly high requirements in terms of its flexibility during assembly and use.

BRIEF DESCRIPTION OF THE DRAWINGS

An exemplary embodiment of the invention is shown in the drawings and is explained in more detail below, in which:

FIGS. 2a, b show the ferrule in two different views;

DETAILED DESCRIPTION

The figures contain partially simplified, schematic representations. In part, identical reference signs are used for like but possibly non-identical elements. Different views of like elements may be scaled differently.

Figure 1A:
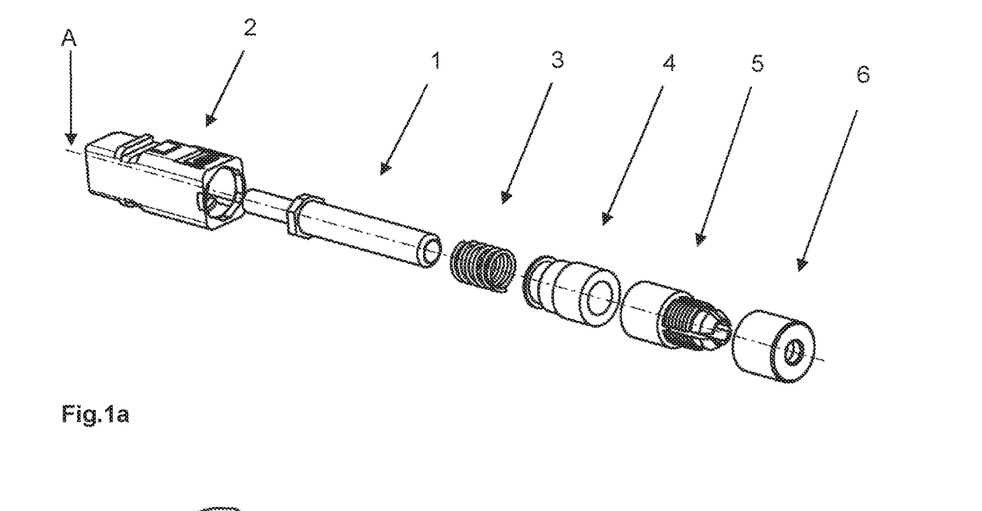
FIG. 1a shows an exploded view of a system comprising a ferrule, a ferrule housing, a ferrule spring, a latching sleeve, a press-fittable screw connection, and a screw element.

FIG. 1a shows an exploded view of a system with a ferrule 1, a ferrule housing 2, a ferrule spring 3, a latching sleeve 4, a press-fittable screw connection 5, and a screwing element 6.

Figure 1B:
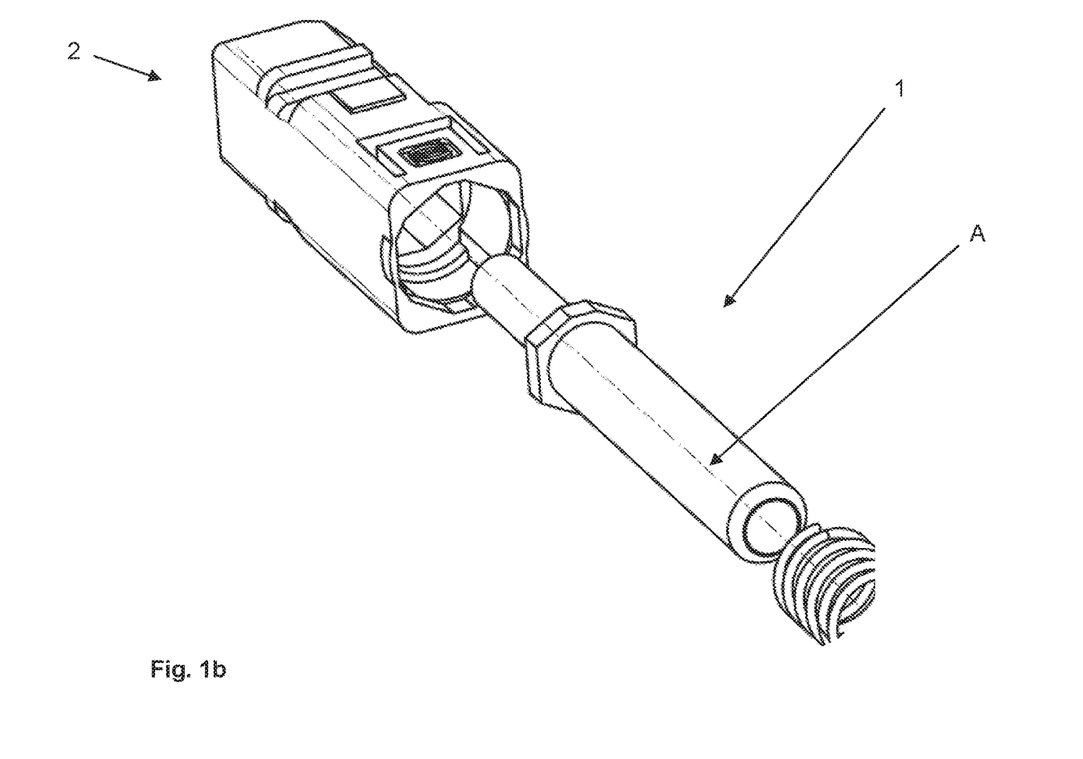
FIG. 1b shows a detail of the previous illustration from a different viewing angle.

FIG. 1b shows a detail of the previous illustration, with the ferrule 1 and the ferrule housing 2 from a different viewing angle. In addition, the ferrule axis A is shown in both illustrations as the axis of symmetry of the ferrule tube, not described in further detail.

Figures 2A, 2B:
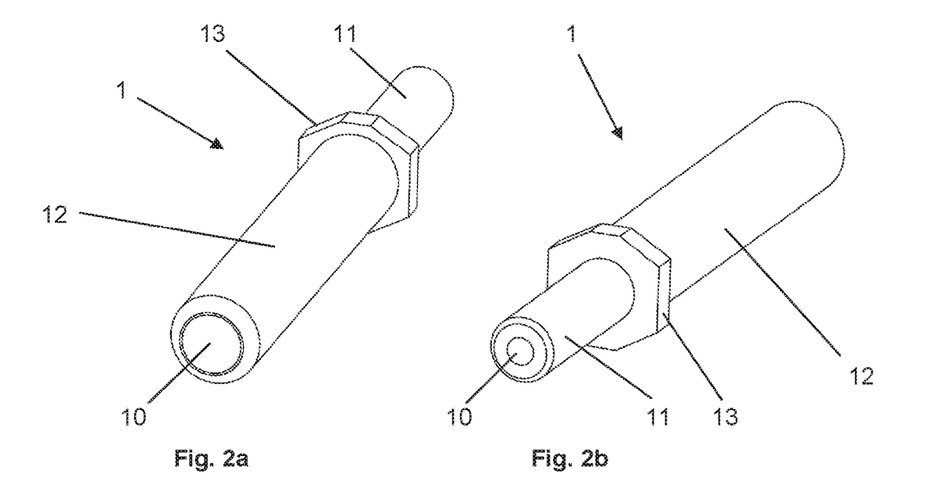

The ferrule 1 is shown in FIGS. 2a and 2b from the cable connection side and from the plug-in side.

The ferrule has said hollow-cylindrical ferrule tube, which is not described in greater detail for reasons of clarity. The ferrule tube has a plug-in region 11 and a cable connection region 12, wherein the ferrule tube has a larger outer diameter at its cable connection region 12 than at its plug-in region 11. Due to its hollow-cylinder shape, the ferrule tube also has an OWG (optical waveguide) receptacle 10, the diameter of which is also larger on the cable connection side than on the plug-in side.

Between the plug-in region 11 and the cable connection region 12, the ferrule has a circumferential ferrule collar 13. This is planar and thus has two faces lying parallel to one another, namely a plug-in-side limit stop face and a cable connection-side spring engagement face, which for reasons of clarity are not provided with reference signs. FIG. 2a provides a view of the spring engagement face of the ferrule collar 13. FIG. 2b shows the limit stop face.

The plug-in-side length of the ferrule collar 13, i.e., its dimension in the plug-in direction, is extremely limited. As can be seen clearly in the drawing despite the perspective view, the plug-in-side length of the ferrule collar is less than 10% of the length of the cable connection region 12.

The ferrule collar 13 has a polygonal outer contour, namely in the form of an irregular octagon. In the present case, the irregular octagon is formed from a regular hexagon in which two opposite corners have been flattened. However, it is clear to a person skilled in the art that any shape other than a circle could perform a comparable function, provided that it can be received form-fittingly in the coding region 2023 of the ferrule housing 2 and held therein.

Figure 3A:
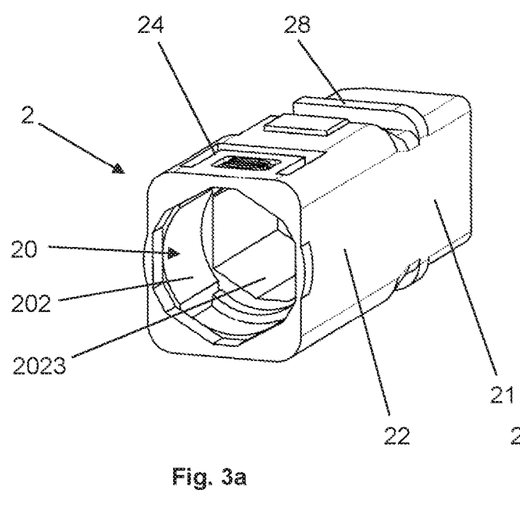
FIGS. 3a, b show the ferrule housing in two different views.

This coding region 2023 can be seen particularly well in FIG. 3a, in which the ferrule housing 2 is shown from the view on the cable connection side. The coding region 2023 is part of the cable-connection-side chamber portion 202 of the continuous contact chamber 20 of the ferrule housing 2.

Figure 3B:
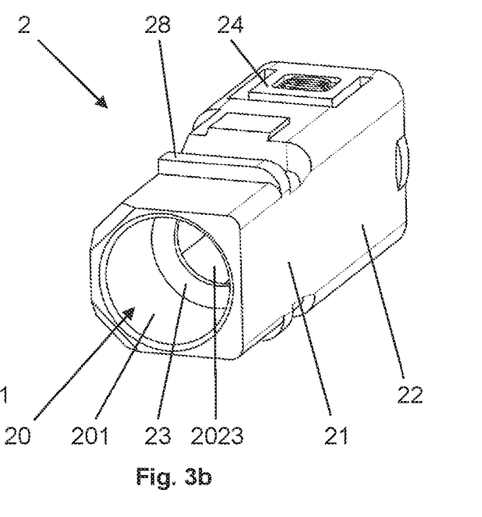

In FIG. 3b, on the other hand, a plug-in-side chamber portion 201 of the contact chamber 20 is clearly visible when looking at the plug-in-side end of the ferrule housing 2. Furthermore, a view is also provided of the feed stop 23, which is a circumferential, inwardly directed molding of the contact chamber 20, by which the contact chamber tapers at this point.

On the cable connection side, the feed stop 23 has a stop face that is oriented perpendicularly to the inner faces of the through-opening 20. On the plug-in side, it has a slope by which it reinforces itself towards the inner surfaces for stability reasons. Of course, any other shape would have the same effect, provided that the feed stop 23 is only capable of providing a stop for the ferrule collar 13 of the ferrule 1 inserted on the cable connection side, thus preventing it from entering the chamber portion 201 on the plug-in side.

In a manner corresponding to the plug-in-side 201 and cable-connection-side 202 chamber portions, the entire ferrule housing 2 also has a plug-in-side 21 and a cable-connection-side 22 housing portion.

At the plug-in-side housing portion 21, the ferrule housing has a taper as well as a latching projection 28 molded thereon in the form of a latching rib as part of a latching mechanism, for example a push-pull mechanism, for latching with a mating connector.

At the cable-connection-side housing portion 22, the ferrule housing 2 has a latching tab 24 for fixing the latching sleeve 4 to a holding collar 42 belonging to the latching sleeve 4.

Figure 4:
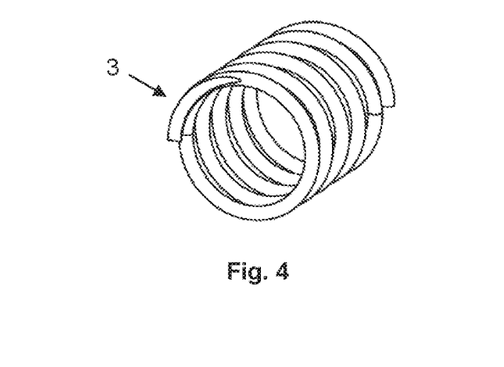
FIG. 4 shows the ferrule spring in the form of a helical spring.

FIG. 4 shows the ferrule spring 3, which is a helical spring.

Figure 5A:
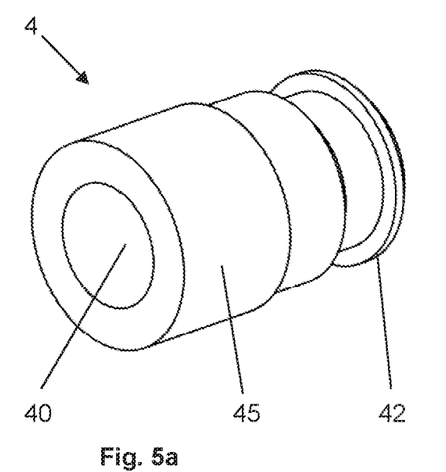
FIGS. 5a, b show the latching sleeve in two different views.
Figure 5B:
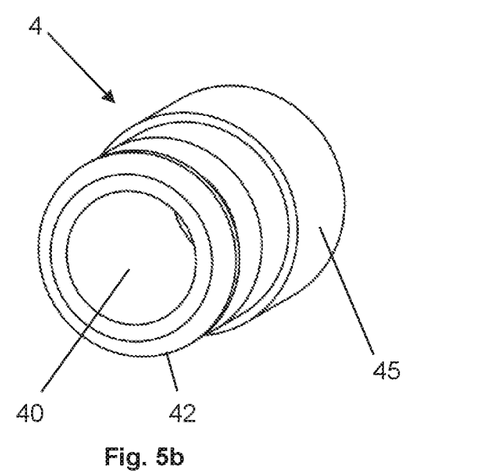

FIGS. 5a and 5b show the latching sleeve 4 with said holding collar 42 and a stop collar 45. With its holding collar 42, the latching sleeve 4 can be latched to said latching tab 24 at the end of the cable-connection-side chamber portion 202 in the ferrule housing 2. Furthermore, the latching sleeve 4 has a cylindrical ferrule feedthrough opening 40 in which the ferrule 1 with its ferrule tube, more precisely with its cable connection region 12, can be accommodated form-fittingly and displaceably along the ferrule axis A. The stop collar 45 serves to provide a stop against the press-on collar 54 of the press-fittable screw connection 5.

Figure 6A:
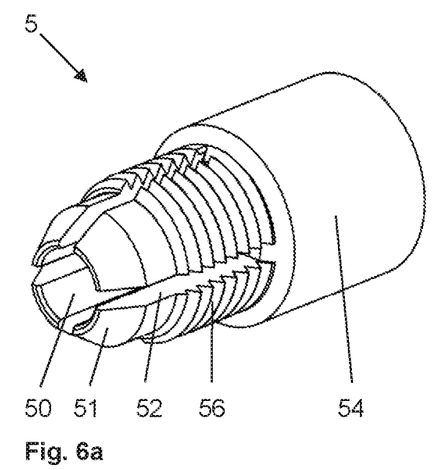
FIGS. 6a, b show the press-fittable screw connection in two different views.
Figure 6B:
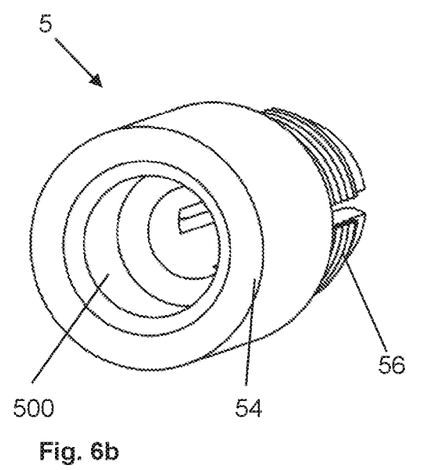

FIGS. 6a and 6b show this screw connection 5, which can be press fit onto the cable connection region 12 of the ferrule tube. This screw connection 5 has a ferrule insertion opening 500 and a press-on collar 54 surrounding same. Once the ferrule 1 is inserted with its cable connection region 12 into the ferrule insertion opening 500, the screw connection 5 can be fixed to the ferrule 1 by pressing its press-on collar 54 onto the cable connection region 12 of the ferrule 1 using a tool, for example pliers.

Adjacently to the press-on collar 54, the screw connection 5 has a threaded portion 56 with an external thread. The threaded portion 56 is in turn adjoined by a tapered thread-free end portion 51, through which an OWG feedthrough opening 50 runs. The OWG feedthrough opening 50 has a smaller diameter than the ferrule insertion opening 500 and is directly adjacent thereto, so that an OWG can be inserted through the OWG feedthrough opening 50 into the ferrule insertion opening 500 and thus also into the ferrule tube arranged therein.

The conical end portion 51 further has a plurality of slots 52 extending into the threaded portion 56.

Figure 7A:
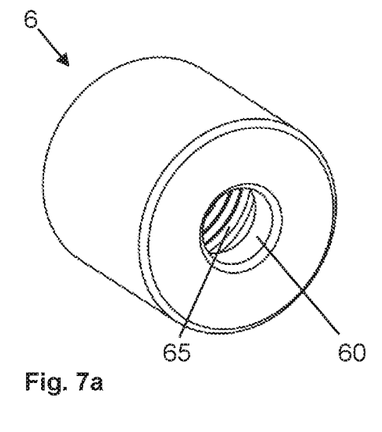
FIGS. 7a, b show the screwing element embodied as a knurled nut in two different views.
Figure 7B:
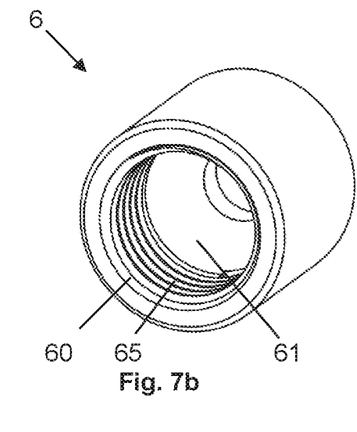

FIGS. 7a and 7b show a screwing element 6 in the form of a knurled nut. This has a through-opening 60 with a screw portion 65 which has an internal thread. Adjacently to this, the screwing element 6 has a funnel-shaped, thread-free end region 61, which is suitable for interacting with the conical end portion 51 of the screw connection 5 during a mutual screw connection and for slightly compressing this end portion 51 and the screw portion 65 by means of the slots 52. Thus, by screwing on the screw connection 5, the screwing element 6 is able to fix an OWG arranged in the ferrule tube to the ferrule 1.

Figure 8A:
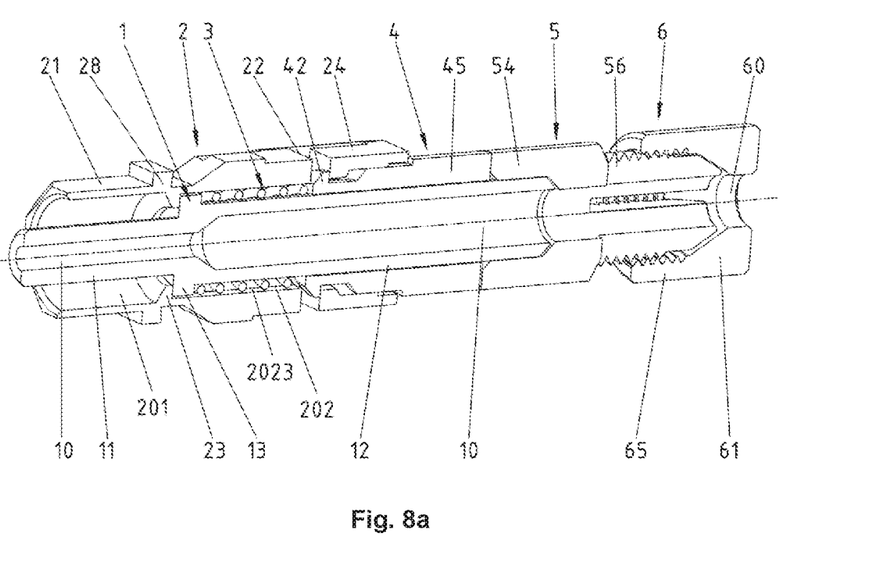
FIG. 8a shows a cross-sectional view of an assembled system in its starting state.
Figure 8B:
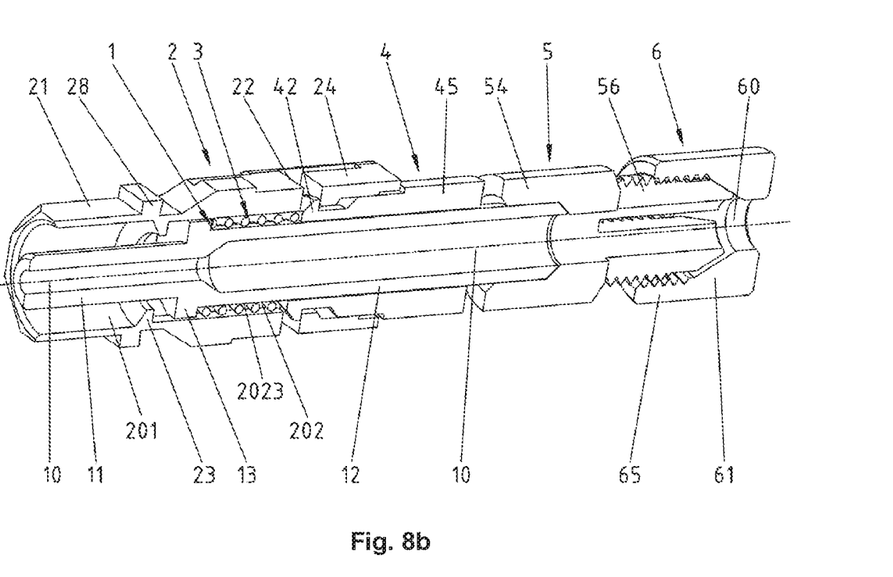
FIG. 8b shows the assembled system in a slightly spring-deflected state in cross-section.

FIGS. 8a and 8b each show a cross-sectional view of the system from FIG. 1 in the assembled state.

In FIG. 8a, the system is in a starting state in which the ferrule collar 13 abuts the feed stop 23 and, at the same time, the press-on collar 54 of the screw connection 5 abuts the stop collar 45 of the latching sleeve 4. The plug-in region 11 of the ferrule 1 protrudes relatively far from the ferrule housing 2 on the plug-in side, compared with the spring-deflected state shown in FIG. 8b below. Since the ferrule spring 3 is already under a certain pretension in the starting state, its spring force acts on the ferrule collar 13 in the direction of the feed stop 23 and presses the ferrule collar 13 against the feed stop 23 with a force corresponding to the pretension.

FIG. 8b thus shows the system in a slightly spring-deflected state. The plug-in region 11 is spring-loaded into the ferrule housing 2. The ferrule spring 3 is thus slightly more compressed compared to the previous illustration. The ferrule spring 3 is supported by the holding collar 42 of the latching sleeve 4. Its spring force acts on the ferrule collar 13 in the direction of the feed stop 23.

Even in this slightly spring-deflected state, the ferrule 1 is already displaced by approximately the pug-in-side length of the ferrule collar 13 in the direction of the cable connection side (to the right in the drawing). The ferrule spring 3 is still far from being fully compressed and the ferrule collar 13 can still move a long way in the direction of the cable connection side. Thus, the plug-in-side length of the ferrule collar 13 is much smaller than the sliding path. Both the ferrule collar 13 and the ferrule spring 3, which is a helical spring, are arranged in the coding region 2023 of the ferrule housing 2. Canting of the ferrule 1 is thus prevented over the entire sliding path. At the same time, a relatively large sliding path is made possible. Both these things are made possible at the same time by the fact that the entire coding region 2023 has a polygonal inner contour which corresponds to the polygonal outer contour of the ferrule collar 13, while at the same time the ferrule spring 3, which is embodied as a helical spring, is arranged in the coding region 2023 so that it surrounds the cable connection region 12 of the ferrule spring 3.

Due to the comparatively large material thickness of the ferrule housing 2 at the coding region 2023, the ferrule 1 is secured against rotation about the ferrule axis A with a high rotation-inhibiting holding force. This rotation-inhibiting holding force is large enough here to allow a screw connection of an OWG to the screw connection 5 of the ferrule 1 by means of the screwing element 6 while the ferrule 1 is already inserted into the ferrule housing 2. This is of great advantage for the possibility of in-field assembly.

The ferrule collar 13 is separated here from the feed stop 23, for example in that a plug-in force coming from the left in the drawing "spring-deflects" the part of the plug-in region 11 previously protruding from the ferrule housing 2, i.e. pushes it at least partially into the ferrule housing 2 in a spring-loaded manner. At the same time, the press-on collar 54 is also separated from the stop collar 45. The ferrule spring 3 continues to engage the spring engagement face of the ferrule collar 13. Its restoring force, which is opposite to the insertion force, acts in the direction of the feed stop 23.

This system can be explained expediently on the basis of its assembly as follows:

A. The ferrule 1 is inserted into the ferrule housing 2 on the cable connection side, wherein its ferrule collar 13 slides through the coding region 2023 of the cable-connection-side chamber portion 202, wherein the ferrule collar 13 form-fittingly cooperates with the coding region 2023 in order to fix the polarization of the ferrule 1 in the ferrule housing 2 and thereby allows a displacement of the ferrule 1 in the direction of the ferrule axis A (not shown here) by the predetermined spring travel, but at the same time prevents a rotation of the ferrule about the ferrule axis A, wherein said insertion process takes place until B. the ferrule 1 is in the starting state relative to the ferrule housing 2, in which the ferrule collar 13, with its plug-in-side limit stop face, abuts the feed stop 23 of the ferrule housing 2 and the plug-in region 11 of the ferrule 1 projects out of the ferrule housing 2 on the plug-in side at least by the predetermined spring travel;

C. the ferrule spring 3 is plugged on the cable connection side onto the cable connection region 12 of the ferrule 1 in the contact chamber 20 of the ferrule housing 2, wherein the ferrule spring is guided unhindered through the coding region 2023 until it engages the spring engagement face of the ferrule collar 13;

D. the latching sleeve 4 is plugged onto the cable connection region 12 of the ferrule 1 in the contact chamber 20 of the ferrule housing 2 and latched with its holding collar 42 at the cable-connection-side end of the ferrule housing 2 in the contact chamber 20, wherein the holding collar 42 simultaneously slightly compresses the ferrule spring 3, so that the latter is under constant pretension and, already in the starting state, presses against the spring engagement face of the ferrule collar 13 while being supported on the holding collar 42 and presses the ferrule collar against the feed stop 23 of the ferrule housing 2;

E. the separate screw connection 5 is plugged with its press-on collar 45 onto the cable connection region 12 of the ferrule tube until it abuts the latching sleeve 4, then F. its press-on collar 45 is pressed onto the cable connection region 12 of the ferrule tube by means of a tool and thus attached to it;

G. an OWG is inserted through the screwing element 5 into the OWG receptacle 10 of the cable connection region 12 of the ferrule tube and pushed into the ferrule tube until its end is flush with the plug-in-side end of the ferrule tube, i.e. with the plug-in region 11;

H. the knurled nut 6 is screwed onto the screw connection 5 and the OWG is thereby fixed in the ferrule 1.

Even though various aspects or features of the invention are each shown in combination in the figures, it is apparent to the person skilled in the art—unless otherwise indicated—that the combinations shown and discussed are not the only possible ones. In particular, corresponding units or feature combinations from different exemplary embodiments may be interchanged with each other.

LIST OF REFERENCE SIGNS

A ferrule axis
1 ferrule
10 OWG receptacle
11 plug-in region
12 cable connection region
13 ferrule collar
2 ferrule housing (SC housing)
20 contact chamber
201 plug-in-side chamber portion
202 cable-connection-side chamber portion
2023 coding region
21 plug-in-side housing portion
22 cable-connection-side housing portion
23 feed stop
24 latching tab
28 latching projection (latching rib)
3 ferrule spring (helical spring)
4 latching sleeve
40 ferrule feedthrough opening
42 holding collar
45 stop collar
5 press-fittable screw connection
50 OWG feedthrough opening
500 ferrule insertion opening
51 conically tapered end portion
52 slots
54 press-on collar
56 threaded portion (with external thread)
6 screwing element (knurled nut)
60 through-opening
61 funnel-shaped end region
65 screw portion (with internal thread)

The invention claimed is:
1. A system for an optical plug-in connector and/or an optical plug-in connector module, comprising:
  a ferrule (1), comprising
    a hollow-cylindrical ferrule tube for accommodating an optical waveguide ("OWG"), and
    a ferrule axis (A) defined by the hollow-cylinder shape,
    wherein the ferrule (1) has a plug-in region (11) at a plug-in-side end of the ferrule tube and a cable connection region (12) at an opposite cable-connection-side end of the ferrule tube,
    wherein the ferrule (1) has, between its plug-in region (11) and its cable connection region (12), a substantially planar ferrule collar (13) having a plug-in-side limit stop face and a cable-connection-side spring engagement face, and
    wherein the ferrule collar (13) has a non-circular outer contour;
  a ferrule housing (2) with
    a substantially cuboidal outer contour and
    a plug-in-side (21) housing portion and
    a cable-connection-side (22) housing portion and
    a contact chamber (20) running longitudinally through the ferrule housing (2) for receiving the ferrule (1),
    wherein the contact chamber (20) has a coding region (2023) with a non-circular cross-section, in which the ferrule collar (13) can be form-fittingly received and held,
    wherein the contact chamber (20) has a plug-in-side chamber portion (201) and a cable-connection-side chamber portion (202),
    wherein the ferrule housing has a feed stop (23) between the plug-in-side chamber portion (201) and the cable-connection-side chamber portion (202), at which the contact chamber (20) tapers at least on the cable-connection side,
    wherein the coding region (2023), in which the contact chamber (20) has the non-circular cross-section, belongs to the cable-connection-side chamber portion (202) and directly adjoins the feed stop (23),
    wherein a length of the coding region (2023) corresponds at least to a predetermined spring travel of the ferrule (1) in the ferrule housing (2);
  a ferrule spring (3);
  a latching sleeve (4);
  a press-fittable screw connection (5) to the cable connection region (12) of the ferrule (1); and
  a screwing element (6),
    wherein the latching sleeve (4) has a holding collar (42) with which it is latched in the ferrule housing (2) at the end of the cable-connection-side chamber portion (202),
    wherein the latching sleeve (4) has a cylindrical ferrule feedthrough opening (40) in which the ferrule (1) with its cable connection region (12) is form-fittingly and displaceably received along the ferrule axis (A),
    wherein the ferrule (1) is guided through the contact chamber (20),
    wherein the ferrule collar (13) is form-fittingly received in the coding region (2023) of the ferrule housing,
    wherein, in a starting state, the ferrule (1) projects both with its plug-in region (11) at least by the predetermined spring travel from the ferrule housing (2) on the plug-in side and with its cable connection region (12) from the latching sleeve (4) on the cable connection side,
    wherein the ferrule spring (3), supported on the holding collar (42) of the latching sleeve (4), engages the spring engagement face of the ferrule collar (13), and
    wherein a spring force of the ferrule spring (3) acts on the ferrule collar (13) in the direction of the feed stop (23) of the ferrule housing (2).
2. The system as claimed in claim 1,
wherein the ferrule collar (13) has a polygonal outer contour.
3. The system as claimed in claim 1,
wherein the ferrule collar (13) is oriented with its limit stop face and its spring engagement face at right angles to the ferrule axis (A).
4. The system as claimed in claim 1,
wherein the coding region (2023) has a polygonal cross-section.
5. The system as claimed in claim 1,
wherein the outer contour of the ferrule housing (2) tapers at its plug-in-side portion (21) at least on two opposing side walls to create an indentation and to use a resulting space for at least part of a latching mechanism (28).
6. The system as claimed in claim 1,
wherein the ferrule housing (2) is a "SC" (Subscriber Connector) housing.
7. The system as claimed in claim 1, wherein the plug-in region (11) of the ferrule (1) can be pushed in a spring-loaded manner, i.e., spring-deflected, into the ferrule housing (2) by the predetermined spring travel.

8. The system as claimed in claim 1,
wherein the press-fittable screw connection (5) has a press-on collar (54) with a cylindrical ferrule insertion opening (500), by which it is plugged onto the cable connection region (12) of the ferrule tube protruding from the latching sleeve (4) on the cable connection side and is press-fitted thereto, and
wherein the screw connection (5) has, adjacently to the press-on collar (54), a hollow-cylindrical threaded portion (56) with an external thread and an OWG feedthrough opening (50), wherein the OWG feedthrough opening (50) has a smaller diameter than the ferrule insertion opening (500) and directly adjoins the ferrule insertion opening (500).

9. The system as claimed in claim 8,
wherein the screw connection (5) which can be threaded on has, adjacently to its threaded portion (56), a tapered non-threaded end portion (51) through which the OWG feedthrough opening (50) runs,
wherein the end portion (51) has a plurality of slots (52) extending into the threaded portion (56),
wherein furthermore the screwing element (6) has a through-opening (60),
wherein the through-opening (60) has a screw portion (65) with an internal thread and, adjacently thereto, a funnel-shaped, thread-free end region (61), whereby the screwing element (6) is capable of fixing an OWG arranged in the ferrule tube to the ferrule (1) by screwing to the screw connection (5).

10. The system as claimed in claim 1,
wherein the ferrule spring (3) is a helical spring through which the ferrule tube with its cable connection region (12) is passed.

11. The system as claimed in claim 1,
wherein, in the starting state of the system, the screw connection (5), with its press-on collar (54), abuts the latching sleeve (4) by the force effect of the ferrule spring (3).

12. The system as claimed in claim 1,
wherein in the starting state the ferrule collar (13) abuts the feed stop (23) of the ferrule housing (2) by a force effect of the ferrule spring (3).

13. The system as claimed in claim 1,
wherein a plug-in-side length of the ferrule collar is smaller than the predetermined spring travel of the ferrule (1).

14. An optical plug-in connector module for a plug-in connector modular system,
wherein the optical plug-in connector module comprises the system as claimed in claim 1.

15. A method, comprising the following steps:
providing a ferrule (1), comprising
a hollow-cylindrical ferrule tube for accommodating an optical waveguide ("OWG"), and
a ferrule axis (A) defined by the hollow-cylinder shape,
wherein the ferrule (1) has a plug-in region (11) at a plug-in-side end of the ferrule tube and a cable connection region (12) at an opposite cable-connection-side end of the ferrule tube,
wherein the ferrule (1) has, between its plug-in region (11) and its cable connection region (12), a substantially planar ferrule collar (13) having a plug-in-side limit stop face and a cable-connection-side spring engagement face, and
wherein the ferrule collar (13) has a non-circular outer contour;
providing a ferrule housing (2) with
a substantially cuboidal outer contour and
a plug-in-side (21) housing portion and
a cable-connection-side (22) housing portion and
a contact chamber (20) running longitudinally through the ferrule housing (2) for receiving the ferrule (1),
wherein the contact chamber (20) has a coding region (2023) with a non-circular cross-section, in which the ferrule collar (13) can be form-fittingly received and held,
wherein the contact chamber (20) has a plug-in-side chamber portion (201) and a cable-connection-side chamber portion (202),
wherein the ferrule housing has a feed stop (23) between the plug-in-side chamber portion (201) and the cable-connection-side chamber portion (202), at which the contact chamber (20) tapers at least on the cable-connection side,
wherein the coding region (2023), in which the contact chamber (20) has the non-circular cross-section, belongs to the cable-connection-side chamber portion (202) and directly adjoins the feed stop (23),
wherein a length of the coding region (2023) corresponds at least to a predetermined spring travel of the ferrule (1) in the ferrule housing (2);
providing a ferrule spring (3);
providing a latching sleeve (4), the latching sleeve (4) having
a holding collar (42) and
a cylindrical ferrule feedthrough opening (40);
providing a press-fittable screw connection (5) to the cable connection region (12) of the ferrule (1);
providing a screwing element (6); and
assembling an optical plug-in connector and/or an optical plug-in connector module, wherein
A. the ferrule (1) is inserted into the ferrule housing (2) on the cable connection side, wherein its ferrule collar (13) slides through the coding region (2023) of the cable-connection-side chamber portion (202), wherein the ferrule collar (13) form-fittingly cooperates with the coding region (2023) in order to fix a polarization of the ferrule (1) in the ferrule housing (2) and thereby allows a displacement of the ferrule (1) in the direction of the ferrule axis (A) by the predetermined spring travel, but at the same time prevents a rotation of the ferrule (1) about the ferrule axis (A), wherein the insertion process takes place until
B. the ferrule (1) is in the starting state relative to the ferrule housing (2), in which the ferrule collar (13), with its limit stop face, abuts the feed stop (23) of the ferrule housing (2) and the plug-in region (11) of the ferrule (1) projects out of the ferrule housing (2) on the plug-in side at least by the predetermined spring travel;
C. the ferrule spring (3) is plugged on the cable connection side onto the cable connection region (12) of the ferrule (1) in the contact chamber (20) of the ferrule housing (2), wherein the ferrule spring (3) is guided unhindered through the coding region (2023) until it engages the spring engagement face of the ferrule collar (13);
D. the latching sleeve (4) is plugged onto the cable connection region (12) of the ferrule (1) in the contact chamber (20) of the ferrule housing (2) and latched with its holding collar (42) at the cable-connection-side end of the ferrule housing (2) in the contact chamber (20), wherein the holding collar (42) simultaneously compresses the ferrule spring (3), so that the ferrule spring (3) is under constant pretension and, already in the starting state, presses against the spring engagement face of the ferrule collar (13) while being supported on the holding collar (42) and presses the ferrule collar against the feed stop (23) of the ferrule housing (2);

E. the press-fittable screw connection (5) is plugged with its press-on collar (45) onto the cable-connection-side end of the ferrule tube, and then;

F. the press-on collar (45) is pressed onto the cable connection region (12) of the ferrule tube by a tool and thus attached to it;

G. an OWG is inserted through the screwing element (5) into the cable connection region (12) of the ferrule tube and pushed into the ferrule tube until its end is flush with the plug-in-side end of the ferrule tube;

H. the screwing element (6) is screwed onto the screw connection (5) and the OWG is thereby fixed in the ferrule (1).

16. The method as claimed in claim 15, wherein in method step E the press-fittable screw connection (5) is inserted with its press-on collar (54) onto the cable connection region (12) of the ferrule tube until it abuts the latching sleeve (4).

* * * * *